R. BUNZLAU & C. L. STOLL.
ELASTIC WHEEL TIRE.
APPLICATION FILED JUNE 8, 1916.
1,213,834.
Patented Jan. 30, 1917.
3 SHEETS—SHEET 2.
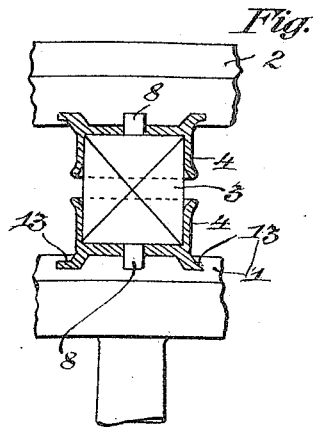
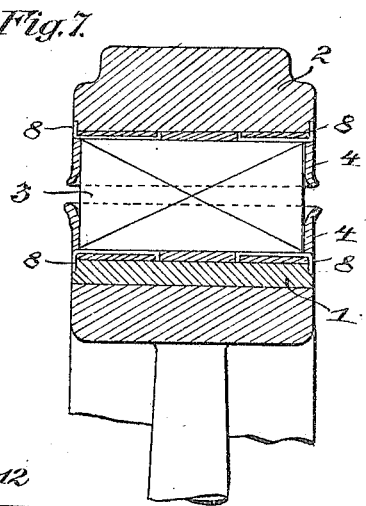
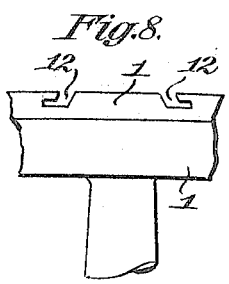
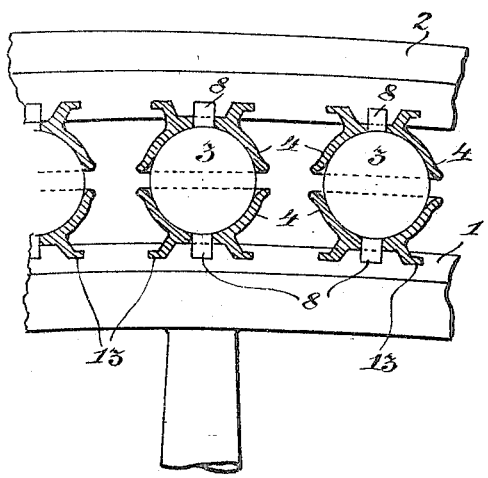
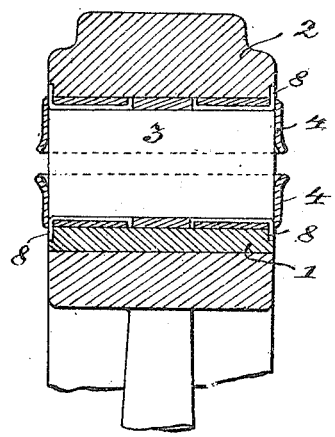

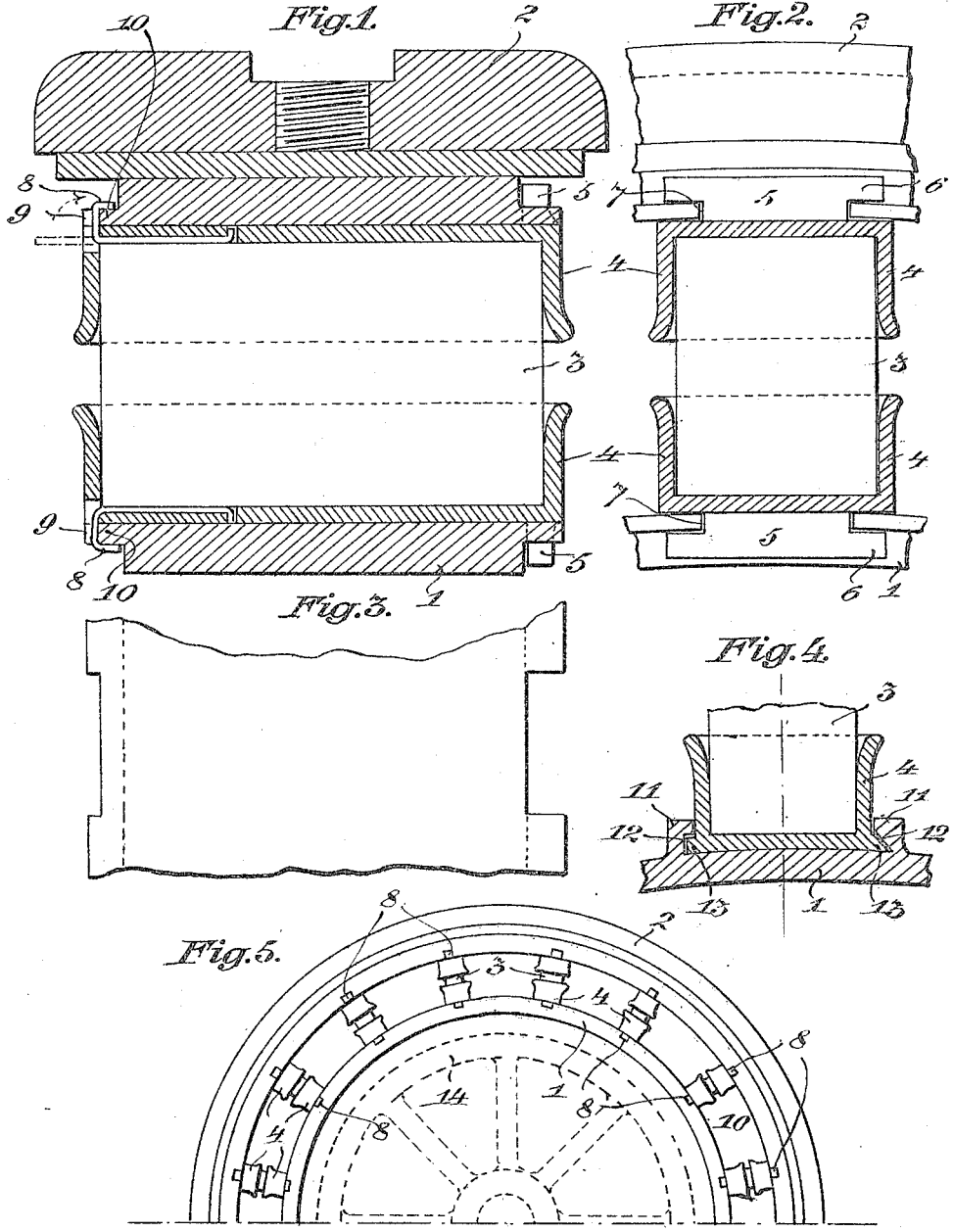

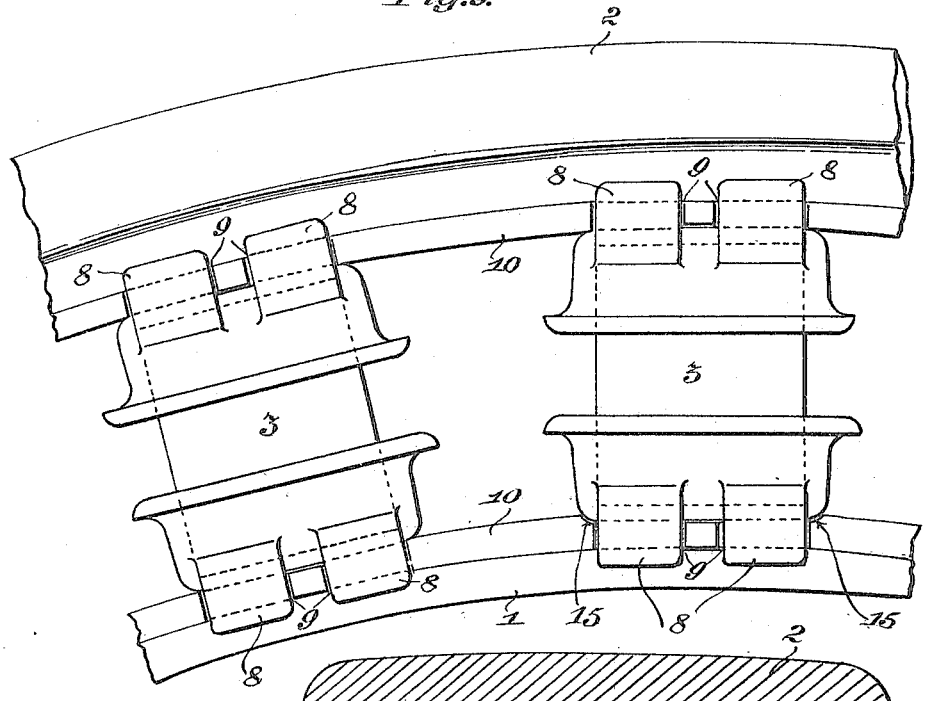
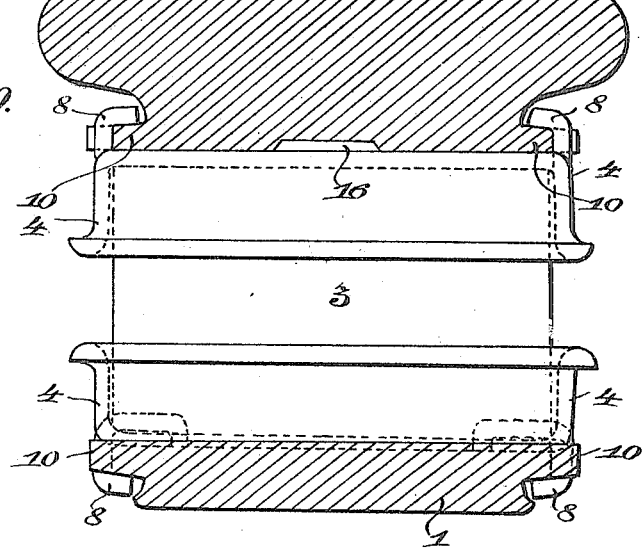

UNITED STATES PATENT OFFICE.

ROBERT BUNZLAU AND CARL LUDWIG STOLL, OF VIENNA, AUSTRIA-HUNGARY, ASSIGNORS TO THE FIRM "SEMBUSTO" ELASTISCHE RADBEREIFUNGEN GESELLSCHAFT M. B. H., OF VIENNA, AUSTRIA-HUNGARY.

ELASTIC WHEEL-TIRE.

1,213,834.  Specification of Letters Patent.  Patented Jan. 30, 1917.

Application filed June 8, 1916. Serial No. 102,585.

*To all whom it may concern:*

Be it known that we, ROBERT BUNZLAU and CARL LUDWIG STOLL, the first a citizen of Austria, the second a citizen of Saxony, Germany, residing at Vienna, Austria-Hungary, have invented new and useful Improvements in Elastic Wheel-Tires, of which the following is a specification.

The present invention relates to elastic wheel tires consisting of an inner rim, an outer rim and elastic bodies made up of elastic material such as caoutchouc or its substitute, said elements being interposed between the two rims.

According to this invention the elastic elements or bodies are seated in cup shaped members, portions of which engage depressions or grooves in the corresponding rims, said members being provided with projections or lugs which engage recesses in the rims, so that the entire elastic tire may be built up and held in position without the use of any screw or the like.

The rims may be provided with a common or with two separated dovetailed or undercut grooves in which the base portion or base portions respectively of the said cup shaped members are to be inserted. Also each cup shaped member may be provided at each side with two lugs. In all cases the lug or lugs may be composed of sheet metal strips secured in the said cup shaped members in suitable manner. In order to avoid shearing off of the elastic bodies the edges of the cup shaped members may be flared or enlarged. The two rims with the elastic elements therebetween form an elastic tire which may be placed on a wheel and be removed from the same.

Figure 1 of the annexed drawing is a sectional view of the improved wheel tire. Fig. 2 is a fragmental side elevation, the cup shaped members being shown in section. Fig. 3 shows a portion of the inner rim in a plan view. Fig. 4 shows in a sectional view corresponding to Fig. 2 another form of the invention. Fig. 5 shows the tire mounted upon a wheel. Figs. 6 and 7 show a further modification in two sectional views and Fig. 8 shows in a partial view the inner rim of this modified tire mounted upon a wheel. Figs. 9 and 10 show a side view and cross sectional view respectively of a further modification of the invention, the cupshaped members being provided with two lugs at each side. Figs. 11 and 12 illustrate in a similar manner a modification using cylindrical elastic bodies.

The tire consists of an inner rim 1, an outer rim or tread 2 and resilient or elastic elements interposed therebetween and arranged in suitable distances apart of each other (Fig. 5). The resilient elements are each formed by a body 3 of caoutchouc or its equivalent or substitute, said body being seated in cupshaped members 4.

In Figs. 1–3 each of the cupshaped members 4 is provided at one side with a lug 5 having enlarged ends 6 and the lugs are to be inserted in recesses 7 of the rims 1 and 2. Each of the members 4 has secured thereon at the other side a lug 8, which is preferably made of a sheet metal strip, said strip being capable of being bent. After the cup shaped members are placed in position with their lugs 5 engaging the recesses 7, the lugs 8 at the other side are bent over, so as to engage a recess 9 of the rims 1 and 2 respectively and to overlap a flange 10 of the rims. In this manner the cups 4 with the elastic bodies 3 placed therein are held firmly in position without the use of any screw.

In the arrangement shown in Fig. 4 the rims 1 and 2 are provided with ledges 11 being undercut so as to form transverse grooves 12 in which base flanges 13 on both the sides of the cup 4 are to be inserted. Said grooves may have any suitable for example dovetailed form as shown at the right in Fig. 4. The structure consisting of the two rims 1 and 2 together with the entirety of the resilient elements therebetween may be mounted with the inner rim 1 upon a wheel 14 (Fig. 5), so as to be capable of removing it therefrom. The outer rim may be composed of several parts as shown in Fig. 1 or of a single piece as shown in Figs. 6 and 7. In connection with this arrangement the cups 4 have on both ends the lugs 8 formed each by a separate sheet metal strip which is secured in the base portion of the cup. The undercut or dovetailed grooves 12 are cut in the body of the rims 1 and 2, so that the ledges (11) are dispensed with. Each cup 4 may have at both its ends a pair of lugs 8 as shown in Figs. 9 and 10, and the flanges 10 of the rims 1 2 have accordingly two recesses 9 for the said pair of lugs 8. The lugs 8 being formed by sheet metal pieces overlap with their hook shaped ends the flanges 10 of the rims. The cups 4 may be seated in flat slight depressions of the two rims as shown at 15 in Figs. 9 and 10 or only a portion or portions of the base parts of the cups may engage such depressions as shown at 16 in Fig. 10. In all structures hereinbefore described parallelopipedal bodies 3 of resilient material are lodged in the cups, but said bodies may also be made cylindrical as shown in Figs. 11 and 12, the cups 4 being accordingly shaped. The edges forming the mouth of the cups may be flared or enlarged as shown, so that the elastic bodies are prevented from being sheared off.

The elastic bodies being firmly held in position by the cups act not only as resilient means but also as a carrying or transmitting means between the two rims of the tire. In all cases each of the resilient elements (4, 3, 4) may be easily removed by bending back the lug or lugs 8 respectively, and a new element may be applied readily and secured only by bending over its lug or lugs.

Claims.

1. In an elastic wheel tire the combination of an inner rim, an outer rim and resilient elements interposed therebetween, each of said elements being composed of a pair of cup shaped members and of an elastic body seated in the pair of cup shaped members so as to act as a cushioning and at the same time as a transmitting means, the base portion of the cup shaped members being provided with flanges engaging grooves in the respective rim.

2. In an elastic wheel tire the combination of an inner rim, an outer rim and resilient elements interposed therebetween, each of said elements being composed of a pair of cup shaped members and of an elastic body seated in the pair of cup shaped members so as to act as a cushioning and at the same time as a transmitting means, the base portion of the cup shaped members being provided with flanges engaging grooves in the respective rim and with lateral lugs engaging the rim.

3. In an elastic wheel tire the combination of an inner rim, an outer rim and resilient elements interposed therebetween, each of said elements being composed of a pair of cup shaped members and of an elastic body seated in the pair of cup shaped members so as to act as a cushioning and at the same time as a transmitting means, the base portion of the cup shaped members being provided with flanges engaging grooves in the respective rim and with a pair of lateral lugs at each side, said lugs engaging recesses in the rim.

4. In an elastic wheel tire the combination of an inner rim, an outer rim and resilient elements interposed therebetween, each of said elements being composed of a pair of cup shaped members and of an elastic body seated in the pair of cup shaped members so as to act as a cushioning and at the same time as a transmitting means, the base portion of the cup shaped members being provided with flanges engaging grooves in the respective rim and with lateral lugs engaging the rim, said lugs being composed of metal strips capable of being bent over so as to engage the rim.

In testimony whereof we have signed our names to this specification in the presence of two subscribing witnesses.

ROBERT BUNZLAU.
CARL LUDWIG STOLL.

Witnesses:
SIGMUND BAUER,
AUGUST FUGGER.

Copies of this patent may be obtained for five cents each, by addressing the "Commissioner of Patents, Washington, D. C."